Sept. 10, 1968      R. P. SMITH      3,400,968
MOTOR VEHICLE STATION WAGON CAMPER BODY
Filed Jan. 4, 1967      2 Sheets-Sheet 1
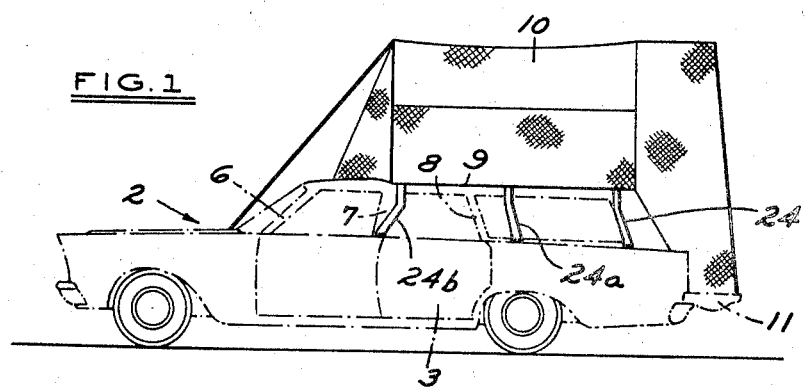
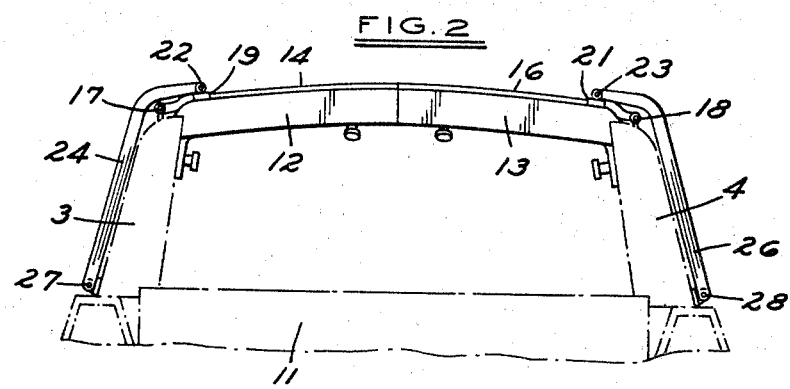
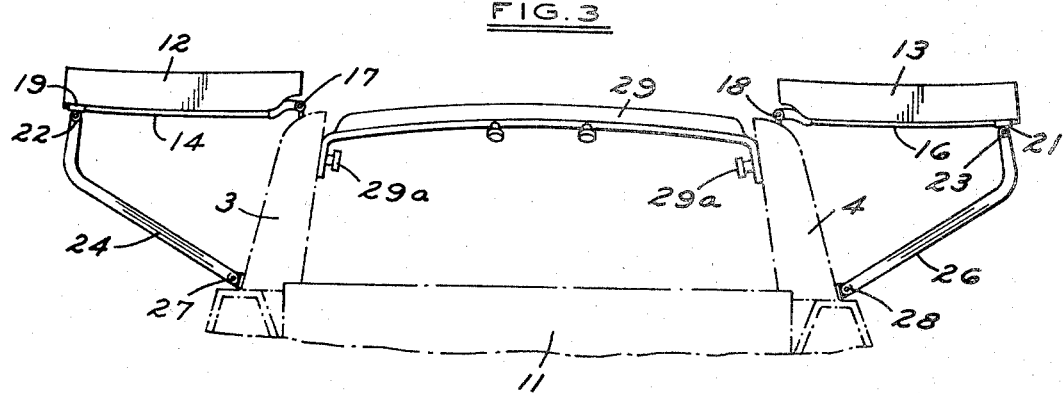
RAYMOND P. SMITH
INVENTOR
BY John R. Faulkner
E. Dennis O'Connor
ATTORNEYS Sept. 10, 1968 R. P. SMITH 3,400,968
MOTOR VEHICLE STATION WAGON CAMPER BODY
Filed Jan. 4, 1967 2 Sheets-Sheet 2
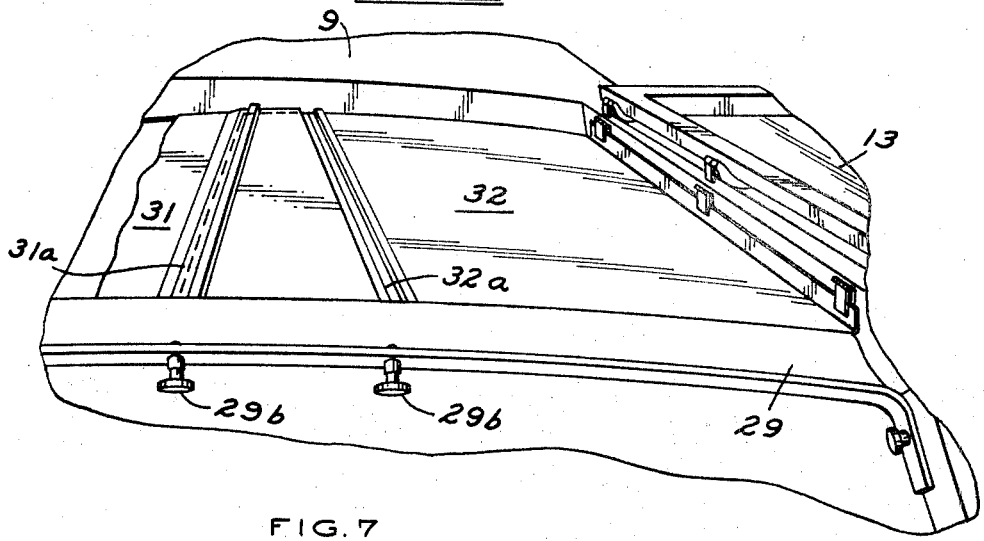
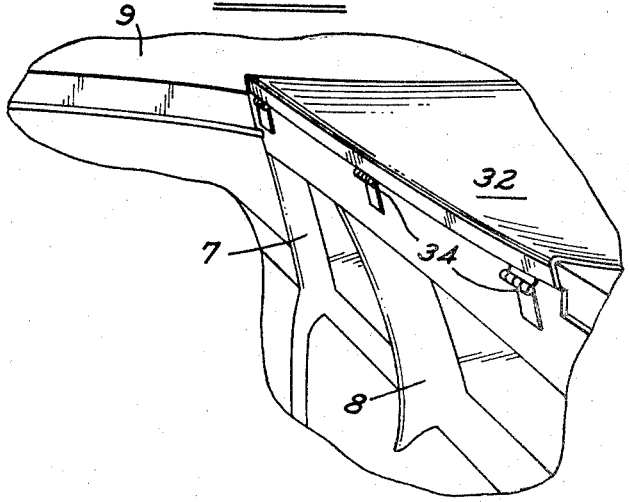
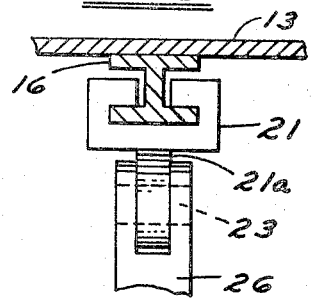
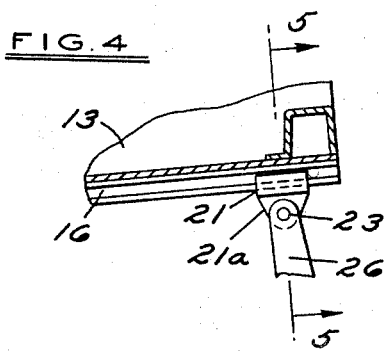
RAYMOND P. SMITH
INVENTOR
BY John R. Faulkner
E. Dennis O'Connor
ATTORNEYS

United States Patent Office 3,400,968
Patented Sept. 10, 1968

3,400,968
MOTOR VEHICLE STATION WAGON CAMPER BODY
Raymond P. Smith, Southfield, Mich., assignor to Ford Motor Company, Dearborn, Mich., a corporation of Delaware
Filed Jan. 4, 1967, Ser. No. 607,225
8 Claims. (Cl. 296—23)

ABSTRACT OF THE DISCLOSURE

A motor vehicle station wagon body convertible into a self-contained camper including a pair of distinct roof panels pivotably supported on the body side walls for swinging movement to a substantially horizontal position outboard of the walls. A removable ceiling panel secured to the walls below the roof and spaced therefrom defines a cargo storage space for storage of a tent which may be erected on the vehicle body to provide housing for the campers.

Background of the invention

Various devices have come to marketing prominence during recent years for use as camping shelters such as camper trailers and pick-up trucks fitted with so-called camper bodies. These have the disadvantage for most owners that they are single purpose vehicles and must remain idle in the normal course of events. The present invention provides a vehicle readily convertible from a regularly usable station wagon into a vehicle convertible into a self-contained camper having sleeping accommodations and sufficient head room for camping purposes.

Brief summary of the invention

A motor vehicle station wagon body convertible into a self-contained camper and constructed in accordance with this invention comprises a pair of side walls and a roof. The roof includes a pair of distinct, elongate panels, the longitudinal axes of which extend substantially parallel to the longitudinal axis of the body. Pivotal support means secure the outboard extremities of the panels to the side walls so that said side walls may be swung to substantially horizontal camper positions outboard of said walls. Support arms, pivotally connected to said panels and said walls support said panels in the camper position. A ceiling comprising a pair of distinct members, is pivotally secured to said walls below the roof and is spaced therefrom to define a cargo storage space.

Brief description of the drawings

FIGURE 1 is a side elevation view of a motor vehicle having a station wagon body constructed in accordance with this invention and converted into a camper;

FIGURE 2 is a rear view of the vehicle body of FIGURE 1, with the roof panels in the closed position;

FIGURE 3 is a view similar to FIGURE 2 but illustrating the roof panels in the open or camper position;

FIGURE 4 is an enlarged view, partially in section, of that portion of FIGURE 3 showing the pivotal connection between a roof panel and supporting rod;

FIGURE 5 is a partial sectional view taken along the line 5—5 of FIGURE 4;

FIGURE 6 is a partial perspective view taken from above the rear of the vehicle body and showing said body in the position illustrated by FIGURE 3; and FIGURE 7 is a partial view taken along the same line of sight as FIGURE 6 but showing the vehicle ceiling in a position outboard of the side walls.

Detailed description of the invention

Referring now in detail to the drawings and in particular to FIGURES 1-3, the numeral 2 denotes a station wagon body convertible into a self-contained camper and having side walls 3 and 4. As may be seen from FIGURE 1, side wall 3 includes A-pillar 6, B-pillar 7 and C-pillar 8. Side wall 4 is similarly constructed. Body 2 has a roof 9 and a tailgate 11. The portion of body 2 that is open when said body is convertible into a camper, as will later be explained in detail, may be covered by a tent 10.

The roof 9 includes a pair of elongate panels 12 and 13 extending from that portion of roof 9 proximate B-pillar 7 to the rear of the vehicle. These panels have a closed position (FIGURE 2), when the body is used for station wagon purposes and an open position (FIGURE 3), when the body is used as a camper. In the closed position panels 12 and 13 abut at the center of the body to form a weathertight seal. Appropriate moldings, not shown, may be used to facilitate such a seal.

A plurality of rails 14 and 16 (only one shown for each panel) are secured to panels 12 and 13 respectively and extend transversely across said panels. These rails are identical in form and have I-shaped cross sections (FIGURE 5). Extremities of rails 14 and 16 are pivotally secured, at 17 and 18 respectively, to side walls 3 and 4. Panels 12 and 13 may therefore be swung from the closed positions shown in FIGURE 2 to substantially horizontal positions outboard of the side walls as in FIGURE 3. While in these outboard positions, panels 12 and 13 provide sleeping berths.

Panel 12 is supported in the outboard camper position by a plurality of support arms 24, 24a and 24b. Panel 13 is similarly supported but only one arm 26 is shown. The upper ends of these support arms are pivotally connected at 22 and 23 to slides 19 and 21 that are capable of sliding movement along rails 14 and 16 respectively. FIGURES 4 and 5 show in detail this arrangement at the upper end of rail 26. Slide 21 is C-shaped and engages rail 16 for sliding movement along said rail. A projection 21a extends from slide 21 and is pivotally connected by a pin 23 to arm 26. The lower ends of arms 24 and 26 are pivotally secured at 27 and 28 to side walls 3 and 4 respectively to accomplish the desired support function. It may thus be seen that the support arms move from the positions shown in FIGURE 2 to the positions shown in FIGURE 3 in response to the opening of roof panels 12 and 13.

Referring now to FIGURES 3, 6 and 7, a support structure 29 extends across the rear of body 2 and is secured to side walls 3 and 4 by fasteners 29a. A ceiling, coextensive in area with panels 12 and 13, is formed by ceiling panels 31 and 32. Since panels 31 and 32 are secured to side walls 3 and 4 by hinges 34, these ceiling panels may be swung to positions outboard of the side walls similarly to panels 12 and 13, and thus have opened and closed positions. When in their closed positions (FIGURE 6), ceiling panels 31 and 32 overlap and are secured to structure 29 in a substantially horizontal plane by fasteners 29b.

Ceiling panels 31 and 32 are spaced from panels 12 and 13; and together with these latter panels define a cargo storage space where tent 10 conveniently may be stored when not in use. Since panels 31 and 32 may be swung outboard of the side walls, a camper may stand upright on the floor of body 2 for dressing or other camping activities. The surfaces of panels 31 and 32 that form the ceiling of the vehicle passenger compartment may be covered with padding 36 or other material suitable for forming the upper surface of a sleeping area.

This invention thus provides a motor vehicle body that may function as a conventional station wagon or easily be converted into self-contained covered camper providing sleeping berths in excess of the sleeping space on the floor of said body. Also, this body provides storage space for the camper covering when it is not in use and sufficient headroom for a camper to stand upright.

It is to be understood that this invention is not limited to the exact embodiment shown and described above but that various changes may be made without departing from the spirit and scope of the invention as defined by the following claims.

I claim:

1. A motor vehicle body including a pair of side walls and a roof, said roof comprising a pair of elongate panels, and means pivotally securing each of said panels to one of said walls for swinging movement from closed positions inboard of said walls to substantially horizontal positions outboard of said walls and a ceiling secured to said walls below said roof and spaced therefrom to define a cargo storage space therebetween when said panels are in the closed positions.

2. A motor vehicle body according to claim 1, said body having A pillars and B pillars, said panels extending from that portion of said roof adjacent the B pillars to the rear of said body.

3. A motor vehicle body according to claim 1, including a pair of support arms, one end of each of said arms pivotally connected to one of said walls, the other end of each of said arms pivotally connected to one of said panels.

4. A motor vehicle body according to claim 3, wherein said other ends of each of said arms are slidable across the surface of said panels.

5. In combination with a motor vehicle having a station wagon body convertible into a self-contained camper, said body having a pair of side walls and a roof, a pair of distinct panels forming a portion of said roof, said panels secured to said walls for swinging movement to substantially horizontal positions outboard of said walls, a ceiling removably secured to said walls below said roof and spaced therefrom to define a cargo space, and foldable covering means being collapsible in said space for storage and being erectable to form a tentlike structure over a portion of said body and said panels outboard of said walls.

6. A motor vehicle station wagon body convertible into a self-contained camper comprising a pair of side walls and a roof, said roof being divided into a pair of elongate panels, the longitudinal axes of said panels extending substantially parallel to the longitudinal axis of said body, pivotal support means securing the outboard extremity of each of said panels to one of said walls for swinging movement of said panels to substantially horizontal camper positions outboard of said walls, a pair of support arms, one end of each of said arms pivotally connected to one of said walls, connecting means pivotally securing the other end of each of said arms to said panels, and a ceiling secured to said walls below said roof and spaced therefrom to define a cargo storage space.

7. The motor vehicle station wagon body of claim 6, wherein said connecting means included a pair of rails, each of said rails extending along the surface of one of said panels substantially perpendicular to the longitudinal axis of said panel, a pair of slide members, each of said slide members secured for sliding movement to one of said rails, each of said other ends pivotally secured to one of said slide members.

8. The motor vehicle station wagon body of claim 6, wherein said ceiling consists of a pair of distinct portions, each of said portions pivotally secured to said walls for swinging movement to substantially horizontal positions outboard of said walls.

References Cited

UNITED STATES PATENTS

| | | | |
|---|---|---|---|
| 2,408,132 | 9/1946 | Weeks | 296—137 |
| 2,551,239 | 5/1951 | Bond | 296—137 |
| 1,035,245 | 8/1912 | Sanders | 296—100 |

FOREIGN PATENTS

| | | |
|---|---|---|
| 1,146,723 | 5/1957 | France. |

PHILIP GOODMAN, *Primary Examiner.*